US008430955B2

(12) United States Patent
Sutton

(10) Patent No.: US 8,430,955 B2
(45) Date of Patent: Apr. 30, 2013

(54) COMPOSITION FOR TREATMENT OF ROADWAY

(75) Inventor: Bryan K. Sutton, Flint, MI (US)

(73) Assignee: Kim Higginbotham, Athens, AL (US)

( * ) Notice: Subject to any disclaimer, the term of this patent is extended or adjusted under 35 U.S.C. 154(b) by 61 days.

(21) Appl. No.: 13/140,058

(22) PCT Filed: Oct. 13, 2010

(86) PCT No.: PCT/US2010/052468
§ 371 (c)(1),
(2), (4) Date: Jun. 16, 2011

(87) PCT Pub. No.: WO2011/047017
PCT Pub. Date: Apr. 21, 2011

(65) Prior Publication Data
US 2012/0112119 A1      May 10, 2012

Related U.S. Application Data

(60) Provisional application No. 61/252,322, filed on Oct. 16, 2009.

(51) Int. Cl.
*C04B 7/00* (2006.01)
(52) U.S. Cl.
USPC .......................................................... 106/713
(58) Field of Classification Search ................... 106/713
See application file for complete search history.

(56) References Cited

U.S. PATENT DOCUMENTS

| 3,525,150 A | 8/1970 | Deiness |
| 6,121,543 A | 9/2000 | Hallmark |
| 2007/0256736 A1 | 11/2007 | Tonkovich et al. |
| 2007/0261606 A1 | 11/2007 | Sutton |

*Primary Examiner* — Paul Marcantoni
(74) *Attorney, Agent, or Firm* — The Weintraub Group, P.L.C.

(57) ABSTRACT

The heat conductivity of a cementitious roadway is improved by adding into the cementitious concentration a powder mixture of a tin alloy or a tin and other powder. Preferably, the alloy is a tin-niobium alloy. Alternatively, a tin powder and a niobium powder are admixed into the composition. Where the powders are used each of the components are present in a 50:50 weight ratio. The powder admixture can also be incorporated into an aqueous latex topcoat for application to a road surface.

21 Claims, No Drawings

COMPOSITION FOR TREATMENT OF ROADWAY

CROSS-REFERENCE TO RELATED APPLICATIONS

This application is a completion application of co-pending U.S. Provisional Application Ser. No. 61/252,322 filed Oct. 16, 2009 for "Composition For Treatment of Roadway" the entire disclosure of which is hereby incorporated by reference including all formal documents.

BACKGROUND OF THE INVENTION

1. Field of the Invention

The present invention pertains to cementitious products. More particularly, the present invention pertains to cementitious products having heat generating components incorporated therewith. Even more particularly, the present invention pertains to a cementitious product having heat absorbing materials incorporated therewith or incorporated into a topcoat overlying the cementitious product.

2. Description of the Prior Art

As is known to those skilled in the art to which the present invention pertains the ability to melt snow and ice from cement and other road materials is an important process in those regions where there are below-freezing temperatures. Typically, the Northeast, Midwest and Northwest portions of the United States as well as parts of Northern Europe, Asia and Australia during their winters, suffer from these conditions. Usually, snow removal invokes the use of plows, as well as salt, to remove snow and melt ice. However, salt, in and of itself, tends to pit and/or otherwise erode the surface be it tarmac, asphalt, cement and the like. Similarly, plows have a tendency to cut or otherwise disrupt the surface due to the cutting of the surface with the blade of the plow.

The present invention, as hereinafter described, provides a material which absorbs heat and is used to facilitate the melting of the precipitate, be it snow or ice, on the surface of the road.

SUMMARY OF THE INVENTION

It has been found that by incorporating a tin-based product, including tin alloys and other tin-based compounds, alone, or in admixture with other components into a roadway material, preferably, cement or concrete, improved melting of ice and/or improved heat absorption is accomplished.

The tin is, ordinarily, added as a powder to a cement or concrete mixture in an amount ranging from at least about 0.075 cubic yards per cubic yard of cement or concrete to about 0.2 cubic yards of tin per cubic yard of the cementitious material. Generally, the tin is admixed with the cementitious material at room temperature and is evenly dispersed throughout, by mixing, prior to pouring the roadway material.

Preferably, the tin is deployed either in admixture with niobium powder is a weight ratio of about 1:1. Less preferable, the tin is deployed as a niobium-tin powder alloy.

The tin alloy or tin and niobium powder mixture may be added to an aqueous topcoat for a roadway.

For a more complete understanding of the present invention reference is made to the following detailed description, and illustrative example.

DETAILED DESCRIPTION OF THE PREFERRED EMBODIMENT

As noted hereinabove, the present invention contemplates the inclusion of a tin product into a roadway cement or concrete to improve the heat absorption thereof.

In a preferred embodiment hereof an improved cement or concrete or other roadway material is provided by incorporating therewith a tin alloy or a tin-containing compound, alone, or in admixture with other compounds.

It is contemplated that the tin be added as a powder and incorporated into a cementitious composition and admixed therewith, at ambient conditions, prior to pouring the cementitious material.

Generally, the tin product will be used in an amount ranging from at least about 0.075 cubic yards thereof per cubic yard of cement or concrete to about 0.2 cubic yards of tin per cubic yard of the cementitious material.

The tin product may be either the stannic or stannous form of tin. The tin may be used as either a tin powder or as a tin alloy powder. Among the useful tin alloys are, for example, solder, pewter, bronze, bell metal, Babbit metal, niobium-tin alloy and the like as well as mixture thereof.

Most useful among the tin alloys herein is a niobium-tin alloy. This alloy is super-conductive at very low temperatures.

Mixtures of tin powder and tin alloy in requisite ratios in order to insure that the amount of tin incorporated into the cementitious material is realized may be used herein.

In practicing the present invention, a preferred tin source is a niobium-tin alloy which is deployed as a powder. Equally preferred, as noted above, is the 1:1 weight ratio mixture of tin and niobium powders.

Alternatively, and in another preferred embodiment hereof, a tin powder may be simply admixed with other powders such as bronze powder, powdered pewter, powdered solder, etc.

Preferably, the tin powder is in admixture with niobium powder in a 50:50 or 1:1 weight ratio. It has been found that where the tin and niobium powders are present in a, respective, amount ranging from about 50 to 100 grams of each per square foot of concrete that the most advantageous result occurs. Stated otherwise, about 4 kilograms of niobium and 4 kilograms of tin powder are used per cubic yard of cement.

The niobium powder which is contemplated for use herein has a meshing of about 45 to 100. The tin powder has a particle size of less than 45 um.

Also, the tin, either as purely tin, the tin-niobium alloy or the mixture of tin and niobium powders may be admixed with other conductive materials, such as, lead, carbon powders and like conductive materials as well as mixtures thereof. Where used such other conductive materials will be used in an amount substantially equal to the amount of tin or tin alloy used in the composition.

In forming a cement or concrete composition in accordance herewith, generally, the composition will contain about 10 to 35 parts, by weight, of Portland cement, per hundred parts, by weight, of the total composition.

The tin and niobium powder addition to the cement or concrete is done at ambient conditions with stirring. The powders can be mixed together and added at once or can be added separately.

The cement composition will also include from about 70 to about 85 parts of limestone ($CaCO_3$) or gravel, such as 60-40 gravel, and the like as well as mixtures thereof, also from about two parts to about 10 parts of water, by weight, per hundred parts, by weight, of the total composition.

Although not wishing to be bound by any theory it appears that the tin absorbs heat generated by the sun as well from the tires traversing the roadway and thus is conducted throughout the roadway surface. The niobium is, also, conductive and, therefore, increases the amount of conductivity.

Optionally, carbon rods may be disposed or placed within the cementitious roadway by placing the rods in the road bed and, then, pouring the cementitious material over the road bed and the rods.

In accordance with the second aspect or embodiment hereof, the tin product, be it alloy or simply the powder, along with the niobium powder may be incorporated into an aqueous latex topcoat. The tin or tin-niobium powders mixture. Such topcoats are well-known and commercially available and, generally, comprise water and a dispersion of polymeric material. When the water evaporates the polymer particles coalesce to form a solid film. With the tin and niobium in the latex, they become suspended in the aqueous dispersion and remain as part of the film upon evaporation of the water.

When the tin and niobium are used in such a topcoat, the tin and niobium powder will be present, preferably, in a total amount ranging from about 10% to about 20%, by weight, based upon the total weight of the composition.

When the tin and niobium powders are used in the topcoat, they are mixed into the aqueous latex at room temperature and with sufficient stirring or agitation to suspend the powders therein. To avoid precipitation of the tin and niobium powders, preferably, the powders are incorporated into the latex at the time of deployment or just prior thereto. The tin and niobium-containing latex is, then, applied by any suitable means such as by spraying, brushing, or the like to form a topcoat over the road surface. Optimally, this is done at ambient conditions.

As noted, the tin and niobium powder mixture does not dissipate on the surface, but rather remains dispersed in the polymer coalescence after evaporation of the water.

From the above, it is seen that there has been described a cement composition or topcoat which promotes heat retention therewithin.

Following is an illustrative, non-limiting example of the present invention. In the example all parts are by weight absent indications to the contrary.

Example 1

This example illustrates the use of the present invention as a cement composition.

A series of 2'×2' cement slabs are prepared during a Fall month by mixing together, at ambient conditions, 560 pounds of Portland cement, 1800 pounds of limestone, 1420 pounds of sand and adding these components to 23 gallons of water to which is then added, with stirring, 3500 grams of powdered 150 microns tin-niobium alloy particles and thereafter pouring the mixture into a mold. Similar slabs are prepared but without the tin additive.

The so-prepared slabs are then placed in a freezer maintained at about 30° F. for about 10 hours. Thereafter, one slab with the tin additive and one without is removed from the freezer and a 250 watt heat lamp is placed over each and the surface temperature is measured using a temperature gun over a one hour period. For the slab with the tin additive the surface temperature rises from 40° F. to 53° F. The slab without the additive has a temperature rise from 32° F. to 37° F.

Example 2

Following the procedure of Example 1, another series of 2'×2' slabs are prepared and set in a freezer for about 10 hours. However, in this Example an additional 3000 grams of lead powder are added to the tin-containing mixture and is used for comparison with a non-additive containing slab.

When removed from the freezer and exposed to the heat lamp the slab with the tin and lead incorporated into it exhibits a temperature increase of 28° F. in one hour as contrasted to the slab without any additive which shows a temperature increase of 8° F.

Example 3

Following the procedure of Example 1, another series of 2'×2' slabs are prepared and set in a freezer for about 10 hours. However, in this Example a series of carbon rods are immersed in the cement prior to freezing. The ends of the rods are flush with the sides of the slabs. Copper bolts are drilled into the rods for use with lead wires for measuring conductivity.

Further, in this example, 4 kilograms of tin powder and 4 kilograms of niobium powder are added with stirring to the cement composition prior to pouring the slabs.

The so-prepared slabs are placed in the freezer which is maintained at about 30° F. After the 10 hour period, the slabs are removed from the freezer and exposed to the environment. This freezing and exposure is repeated over several days and at different outside temperatures. When removed from the freezer, the slabs are heated with a 250 watt heat lamp is placed over each for a three hour period. On a given day when the outside temperature was 16° F., during the three hour period the temperature on the surface rose to 32° F., as measured with a temperature gun.

In addition the conductivity of the slabs is measured by attaching conductive leads at one end to the ends of the copper bolts and to an ohmmeter at their other ends.

It is observed that at a temperature of 16° F. electrical conductivity in the rods is observed.

Although, not wishing to be bound by any theory, it appears that the tin tempers the niobium in cold weather. Also, it appears that the tin and/or tin and niobium cooperate to eliminate the need for air entrainment of hydrogen bubbles which are, usually, introduced into the cement or concrete composition prior to pouring or casting same.

Having, thus, described the invention what is claimed is:

1. A cement composition which comprises:
   an admixture of a tin powder and, a niobium powder.

2. The cement composition of claim 1 wherein:
   the niobium powder and tin powder are present in a 1:1 weight ratio.

3. The cement composition of claim 2 wherein:
   the tin powder and niobium powder are respectively present in an amount ranging from about 50 to 100 grams of each per square foot of cementitious material.

4. The cement composition of claim 2 wherein:
   the niobium powder has a mesh size ranging from about 45 to about 100 mesh.

5. The cement composition of claim 2 wherein:
   the tin powder has a particle size of less than about 45 um.

6. The cement composition of claim 1 wherein:
   the tin is present as a powder of a niobium-tin alloy.

7. The cement composition of claim 1 which further comprises:
   a conductive material mixed with the composition which is either lead powder or carbon powder.

8. A coating composition for a cementitious roadway which comprises:
   an aqueous latex mixed with tin powder and niobium powder.

9. The coating composition of claim 8 wherein:
   the tin powder and niobium powder are present in a 1:1 weight ratio.

10. The coating composition of claim 9 wherein:
the tin powder and niobium powder are respectively present in an amount ranging from about 50 to 100 grams of each per square foot of cementitious material.

11. The coating composition of claim 9 wherein:
the niobium powder has a mesh size ranging from about 45 to about 100 mesh.

12. The coating composition of claim 9 wherein:
the tin powder has a particle size of less than about 45 um.

13. The coating composition of claim 1 wherein:
the tin powder and niobium powder are a powder of a niobium-tin alloy.

14. The coating composition of claim 8 which further comprises:
a conductive material selected from the group consisting of lead powder or carbon powder.

15. A method for improving the heat conductivity of a cement roadway which comprises:
mixing together cement with a cementitious composition an effective amount of tin powder and niobium powder; and
applying the mixture to the existing cement roadway.

16. The method of claim 15 further comprising:
mixing a latex with the tin powder niobium powder and the cement, and wherein the tin powder and niobium are present in a 1:1 weight ratio.

17. The method of claim 16 wherein:
the tin powder and niobium powder are respectively present in an amount ranging from about 50 to 100 grams of each per square foot of cementitious material.

18. The method of claim 16 wherein:
the niobium powder has a mesh size ranging from about 45 to about 100 mesh.

19. The method of claim 16 wherein:
the tin powder has a particle size of less than about 45 um.

20. The method of claim 15 wherein:
the tin is present as a powder of a niobium-tin alloy.

21. The method of claim 15 which further comprises:
a conductive material selected from the group consisting of lead powder or carbon powder.

* * * * *